United States Patent [19]
Kapp et al.

[11] 3,720,625
[45] March 13, 1973

[54] PROCESS FOR PREPARING HYDROGEN OR NITROGEN AND HYDROGEN UNDER PRESSURE

[75] Inventors: Ernst Kapp, Frankfurt; Paul Becker, Eschborn, both of Germany

[73] Assignee: Metallgesellschaft, Frankfurt am Main, Germany

[22] Filed: Nov. 5, 1970

[21] Appl. No.: 87,032

[30] Foreign Application Priority Data

Nov. 19, 1969 Germany..................P 19 58 033.7

[52] U.S. Cl. ..............252/377, 423/359, 423/652, 423/656, 23/312, 252/188.3, 252/373
[51] Int. Cl..........C01b 2/00, C01b 2/30, C01b 1/03
[58] Field of Search............23/213, 212, 210, 312 R; 252/373, 474, 377; 423/359, 65 L, 656

[56] References Cited

UNITED STATES PATENTS

| | | | |
|---|---|---|---|
| 3,069,249 | 12/1962 | Herbert et al. | 23/213 X |
| 3,069,250 | 12/1962 | Weittenhiller et al. | 23/213 X |
| 3,251,652 | 5/1966 | Pfefferle | 23/213 |
| 3,271,110 | 9/1966 | Bratzler | 23/213 |
| 3,382,044 | 5/1968 | Cromeans | 23/213 X |
| 3,382,045 | 5/1968 | Habermehl et al. | 23/213 |
| 3,418,082 | 12/1968 | Ter Haar | 23/213 |
| 3,446,747 | 5/1969 | Bongiorno | 23/213 X |
| 3,532,467 | 10/1970 | Smith et al. | 23/212 R |
| 3,551,106 | 12/1970 | Smith et al. | 23/213 |
| 3,567,381 | 3/1971 | Bearon et al. | 23/212 R |

*Primary Examiner*—Edward Stern
*Attorney*—Burgess, Dinklage & Sprung

[57] ABSTRACT

Process for producing hydrogen and/or a hydrogen-nitrogen mixture for the synthesis of ammonia, which process comprises a gasification of solid or liquid sulfur-containing fuels with oxygen and steam; a desulfurization of the crude gas; conversion of the carbon monoxide contained in the raw gas with hydrogen to form carbon dioxide and hydrogen in two stages using an iron oxide-chromium oxide catalyst and temperatures of 350°–500°C in the first stage and a copper-containing catalyst and temperatures of 190°–280°C in the second stage; scrubbing the gas which is now rich in hydrogen to remove carbon dioxide; and a final purification of the remaining built up raw hydrogen by a removal of residual carbon dioxide and carbon monoxide.

6 Claims, 2 Drawing Figures

PROCESS FOR PREPARING HYDROGEN OR NITROGEN AND HYDROGEN UNDER PRESSURE

BACKGROUND

Pure hydrogen for use as a hydrogenating agent or pure mixtures of hydrogen and nitrogen for the synthesis of ammonia are made from liquid or solid fuels by a gasification with oxygen and stream. The resulting crude gas consists substantially of CO and $H_2$. The CO content of the crude gas is converted on catalysts with hydrogen to form carbon dioxide and hydrogen in a reaction which is known as carbon monoxide conversion. This carbon monoxide conversion can be carried out in one or two stages and comprises a high-temperature conversion at 350°–500°C., e.g. on iron-chromium catalysts. This high-temperature conversion may be combined with a low-temperature conversion carried out at 190°–280°C on a catalyst containing copper. These two conversion stages may directly succeed each other in which case the favorable equilibrium conditions in the second stage result in a very low final CO content between about 0.3 and 0.7 percent.

Crude gases produced by a gasification of solid and liquid fuels with oxygen and steam contain impurities which are poisons for the copper-containing catalyst used for the low-temperature conversion. These impurities include mainly $H_2S$, COS and organic sulfur compounds. Because sulfur compounds tend to poison the copper-containing catalyst, the crude gas must be carefully desulfurized before being subjected to the two-stage conversion. This purification of the gas is effected by known absorption processes in which the crude gas is scrubbed with chemically active absorbent solutions, in most cases with aqueous solutions containing organic bases or alkali metal salts of weak inorganic or organic acids, or with physically dissolving absorbents, which consist preferably of organic polar solvents. This purification of the gas should result in a pure gas standard of less than 0.3 ppm residual sulfur.

The converted gas is scrubbed to remove carbon dioxide so that a raw hydrogen is left which is only slightly contaminated with carbon monoxide, carbon dioxide, methane and argon.

The residual carbon monoxide and any residual carbon dioxide induce undesirable secondary reactions in the various hydrogenating processes and are toxic agents to the catalyst used in the synthesis of ammonia. It may be suitable to remove the inert constituents, particularly methane and argon, from the gas.

The raw hydrogen may be absorbed in a solution of a copper salt and ammonia to absorb the residual carbon monoxide and any residual carbon dioxide. This step is particularly desirable where the hydrogen contains CO in a relatively large concentration. Much less expensive plant is required for a methanization in which carbon monoxide and carbon dioxide are hydrogenated to form $CH_4$, although this step can be recommended only where the gas has only a low CO content, because this will increase the residual concentration of methane. A low CO content can be ensured by a combination of high-temperature and low-temperature conversion stages.

The third process which is available consists of a separation and scrubbing of the gas with liquid nitrogen; this step enables a removal of carbon monoxide as well as of methane and other inert constituents, such as argon. As the last-mentioned process introduces nitrogen into the gas, it may be used only for the production of ammonia synthesis gas but not for the production of hydrogen for use as a hydrogenating agent.

A sequence of process steps which has proved particularly desirable for the production of hydrogen for use as a hydrogenating agent and for the synthesis of ammonia includes gasification, desulfurization, carbon monoxide conversion in two stages, scrubbing to remove carbon dioxide, and methanization and enables production of the gas with very inexpensive equipment. The pure nitrogen which is required for the preparation of an ammonia synthesis gas is available from the air-separating plant in which oxygen is produced for the gasification. The following combination is also usual for the production of ammonia: Gasification, desulfurization, conversion in one stage, scrubbing to remove carbon dioxide, separation and scrubbing of the gas with liquid nitrogen. Whereas the plant for producing synthesis gas in this process is more expensive, it results in a pure synthesis gas so that the plant expenditure and operating costs involved in the ammonia synthesis proper are reduced because the proportion of residual synthesis gas removed to eliminate inert gas is so small that it can be neglected.

The gas which has been produced may be quenched with water so that the sensible heat of the gas is utilized to increase the water vapor content of the gas before the same is subjected to carbon monoxide conversion in a single stage. The carbon monoxide conversion carried out in a single stage at 380°–500°C on iron-chromium oxide catalysts is not affected by sulfur compounds. In terms of the second law of thermodynamics, however, it is more desirable to cool the crude gas indirectly in a waste-heat recovery, in which low-pressure steam and medium-pressure steam up to about 40 kilograms per square centimeter above atmospheric pressure are produced and are utilized for the gasification itself, for the conversion of carbon monoxide, and as heating steam for various purposes, e.g., for the regeneration of the laden absorbent solutions used for a prufication of the gas and/or for a preheating of air and oil for the production of the gas.

The gasification maybe carried out under normal or elevated pressure. A normal pressure is used in some processes for a complete, by-product-free gasification of solid fuels. Higher pressures are preferred for the gasification of liquid fuels because they involve some advantages from the aspect of process technology. For instance, the gas-purifying plants may be much smaller and may be operated at low costs, particularly if physical scrubbing processes are employed. Because the compression of the gasifying agent requires less energy than the compression of the gas produced therefrom, the compression energy requirement is also much reduced. Additional advantages from the aspects of process technology and costs may be expected to result from the use of a gasification pressure which approaches the operating pressure of the succeeding process.

For this reason there is a tendency to carry out the gasification under a higher pressure rather than under a moderate pressure up to about 30 kilograms per square centimeter. Processes using pressures of about 80–90 kilograms per square centimeter are already in use and still higher pressures up to about 150 kilograms per square centimeter are desired. In these processes, the crude gas is preferably cooled directly in that it is quenched with injected water. This process is desirable from the aspect of heat economy if the steam which is introduced into the gas being cooled can be utilized in the succeeding carbon monoxide conversion. If the gas must be purified before being converted, the gas must be cooled much below the conversion temperature and heat is lost with the water which is condensed.

It has been found that an optimum heat economy in the production of hydrogen by a gasification of liquid or solid fuels with steam nd oxygen can be obtained if the gasification is carried out under a pressure of 40–70 kilograms per square centimeter, preferably of 40–50 kilograms per square centimeter, if the carbon monoxide conversion is carried out in the two stages and the hot raw gas is cooled in a waste-heat boiler with production of high pressure steam before the purification to which the gas must be then subjected before the carbon monoxide conversion and which may particularly consist of a desulfurization.

This optimum heat economy is basically due to the fact that the gas remains dry and no water is condensed from the gas in the second carbon monoxide conversion stage carried out under a pressure of 35–60 kilograms per square centimeter and at a temperature of 190°–280°C. The steam which is required for the conversion must be added to the purified gas before the conversion and is available from the waste-heat recovery and discharged from the latter under a pressure which is so high that the steam can first be expanded to perform work.

SUMMARY

The invention relates to a process for producing hydrogen and/or a hydrogen-nitrogen mixture for the synthesis of ammonia, which process comprises a gasification of solid or liquid sulfur-containing fuels with oxygen and steam; a desulfurization of the crude gas; conversion of the carbon monoxide contained in the raw gas with hydrogen to form carbon dioxide and hydrogen in two stages using an iron oxide-chromium oxide catalyst and temperatures of 350°–500°C in the first stage and a copper-containing catalyst and temperatures of 190°–280°C. in the second stage; scrubbing the gas which is now rich in hydrogen to remove carbon dioxide; and a final purification of the remaining built up raw hydrogen by a removal of residual carbon dioxide and carbon monoxide. The process according to the invention is characterized in that the carbon monoxide conversion in the second stage is carried out at a temperature of 190°–280°, preferably 200°–260°C, in the presence of the copper-containing catalyst and under a pressure of 35–60 kilograms per square centimeter absolute pressure, preferably of 40–50 kilograms per square centimeter absolute pressure. The crude gas is cooled in a waste-heat recovery to produce steam under a pressure which is higher by at least 20 kilograms per square centimeter than the pressure in the second conversion stage, and said steam is expanded to perform work.

DESCRIPTION OF THE DRAWING

The flow schemes of two embodiments of the invention are shown by way of example in the drawings.

DESCRIPTION

Figure 1:
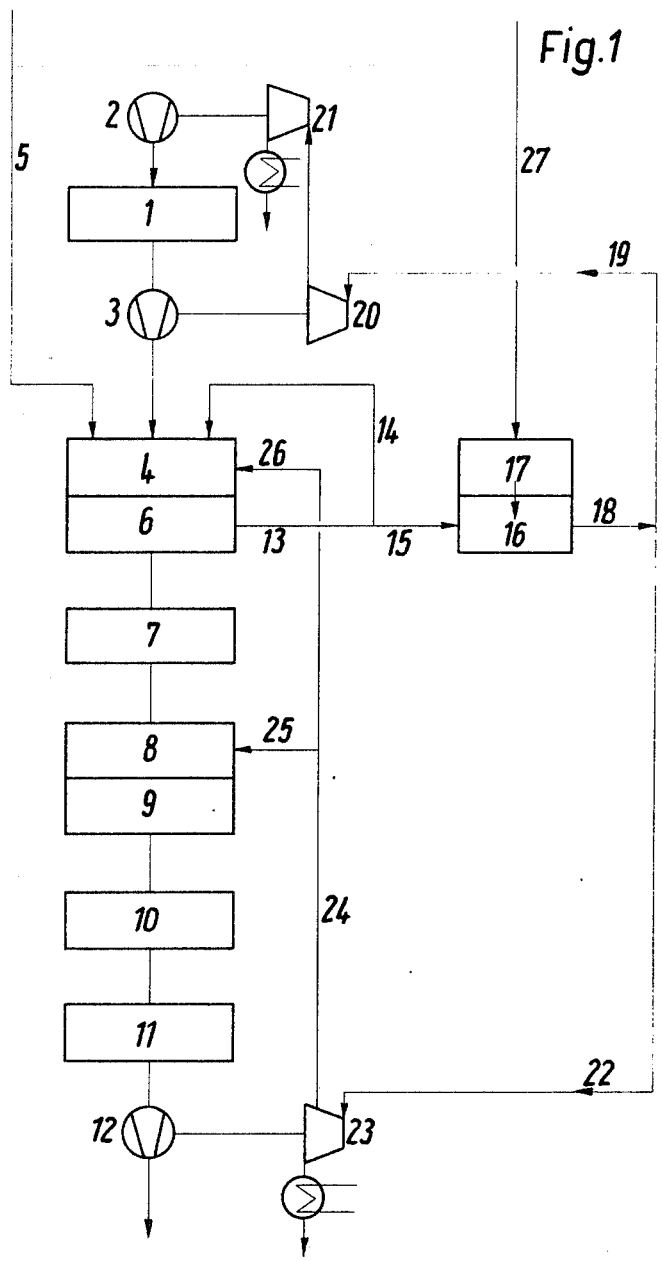
FIG. 1 illustrates the production of hydrogen from heavy oil.

In accordance with the invention, the following sequence of process steps are used:

Gasification at about 40–70 kilograms per square centimeter; cooling of the gas in the waste-heat recovery, desulfurization, two-stage conversion of the carbon monoxide with steam; scrubbing to remove carbon dioxide, fine purification to remove residual carbon monoxide and any carbon dioxide, e.g. by a methanization. The gas may then be further compressed when this is required. A gasification pressure of 40–70 kilograms per square centimeter absolute pressure corresponds to a pressure of 35–60 kilograms per square centimeter in the second conversion stage. Steam under a pressure of 60–120 kilograms per square centimeter is produced in the waste-heat boiler. The pressure of this steam should exceed the pressure in the low-temperature conversion stage by at least 20 kilograms per square centimeter. The steam is used to produce energy, e.g., to drive gas compressors, and may be superheated before such use. The steam may be superheated in a superheater fired with residual gases or in a superheater section of a steam boiler.

In accordance with the invention, the steam for use in the conversion and the heating steam which is required can be expanded before to perform work in a back-pressure pass off turbine from the pressure of the waste-heat boiler to the pressure for the conversion.

The process according to the invention is unique in that it involves a low plant expenditure and requires less power than the high-pressure processes because the gasification and gas purification are carried out under a medium pressure, in which centrifugal compressors and plate-type heat exchangers may be used.

In view of the economies which can be obtained in the synthesis of ammonia, a separation and scrubbing of the gas with liquid nitrogen may be more desirable in the production of synthesis gas for the production of ammonia. In this case, a less thorough desulfurization and a single conversion stage would be sufficient in the high-temperature process. It has been found, however, that in this case too a virtually complete desulfurization and a two-stage conversion results in a higher economy, particularly because the consumption figures are reduced. As a result, the process according to the invention using medium pressures for the gasification and for the gas purification is more desirable in this case too.

In this case, the same plant may be operated to produce at the same time hydrogen as hydrogenating agent and synthesis gas for the production of ammonia. For this purpose, a partial stram of hydrogen is branched off behind the methanizing stage and is mixed with pure nitrogen, or the hydrogen is divided immediately after the scrubber in which carbon dioxide is removed and the hydrogen for use as a hydrogenating agent is purified in the methanizing stage whereas the hydrogen for use in the synthesis of ammonia is purified by a separation and scrubbing of the gas with liquid nitrogen.

The process according to the invention is particularly suitable for a production of gas from heavy oils, including oils having a high sulfur content. Processes carried out under atmospheric pressure are preferred for the gasification of coal; in this case, the gas is compressed for the first time between the waste-heat boiler and the conversion system and gasifying steam may be used to produce energy in that it is expanded to the gasifying pressure to perform work. In a gasification under elevated pressure, it will depend on the conditions whether such utilization is possible or suitable.

In the process which is illustrated in FIG. 1, oxygen under superatmospheric pressure is produced in an air-separating unit 1, which comprises an air compressor 2 and an oxygen compressor 3. This oxygen is used in the gas-producing unit 4 for a gasification of heavy oil supplied through conduit 5. The hot gas delivers its sensible heat in a waste-heat recovery 6 and is then supplied to a desulfurizer 7, in which all sulfur compounds are removed to a residual content below 3 ppm by volume and other deleterious substances are removed too. The gas is preferably purified in this case by being scrubbed for example with methanol at temperatures below 0°C. or with N-methyl pyrrolidone at ambient temperature. One of the above-mentioned chemical scrubbing processes may also be used for this purpose. The purified gas enters the two-stage carbon monoxide conversion system, which comprises a high-temperature conversion stage 8 and a low-temperature conversion stage 9 and in which carbon monoxide is treated with steam for conversion into carbon dioxide and hydrogen except for a small residual content. The conversion system is succeeded by a scrubber 10, in which most of the carbon dioxide is removed from the converted gas and which may be operated with the same absorbent as the gas-purifying unit 7. Residual carbon monoxide and carbon dioxide are hydrogenated in the methanizing unit 11 with hydrogen to form $CH_4$. A centrifugal compressor 12 is used to compress the finished hydrogen gas to the desired pressure.

The steam which is produced in the waster-heat recovery 6 is withdrawn through a conduit 13. A small portion of this steam is supplied through conduit 14 to the gasifying unit. The main portion of the steam in conduit 13 flows through conduit 15 into a superheater section 16 of a steam boiler 17 and is heated there together with the additionally produced steam. Part of the superheated steam flows through conduits 18 and 19 into a back-pressure pass off turbine 20, which drives the oxygen compressor 3. From turbine 20, the steam flows into a condensing turbine 21, which drives the air compressor 2. The remainder of the superheated steam flows through conduits 18 and 22 into a turbine 23, which drives the gas compressor 12. This turbine operates partly as a condensing turbine. The back-pressure steam is supplied through conduits 24 and 25 as converting steam into the high-temperature conversion stage 8 and through conduits 24 and 26 into the gas-producing unit 4, in which this part of the back-pressure steam is used as heating steam to preheat oil and oxygen. The boiler 17 comprising the superheater 16 is supplied with heavy oil at the required rate through conduit 27.

Figure 2:
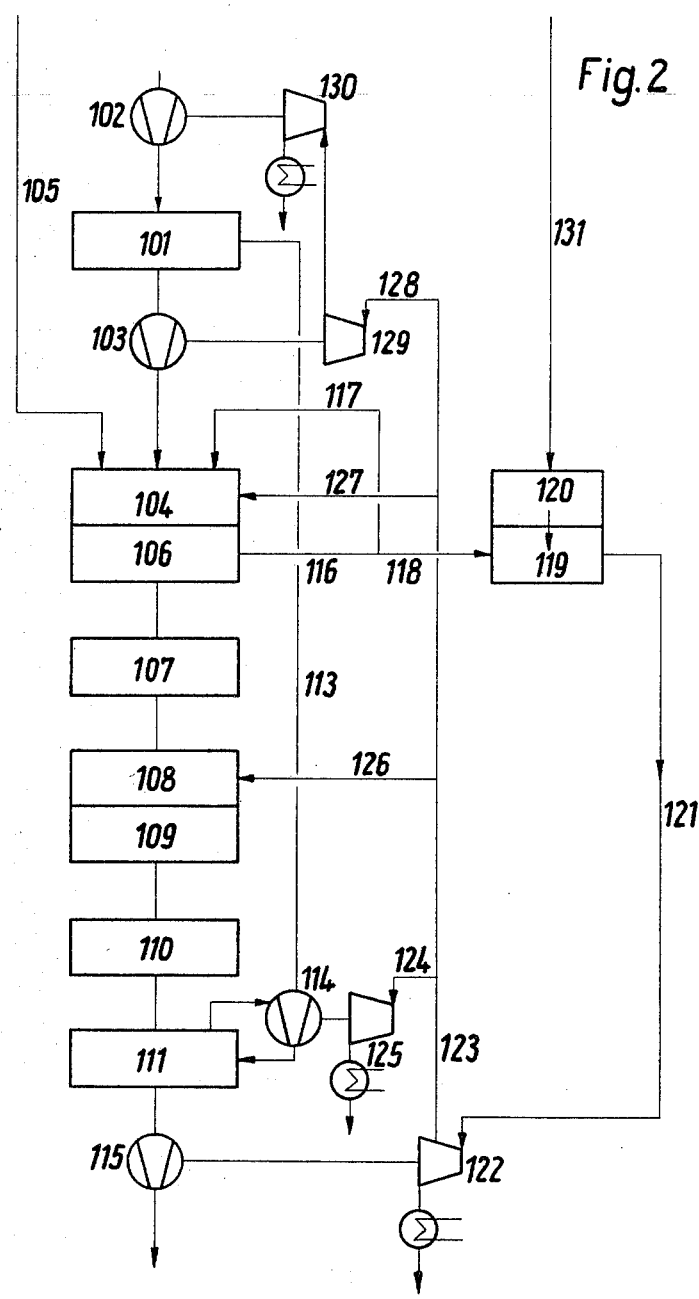
FIG. 2 shows the production of ammonia synthesis gas from heavy oil; in this case, the gas is separated and scrubbed with liquid nitrogen to remove residual carbon monoxide and inert constituents.

In the embodiment shown in FIG. 2, an air-separating plant 101 comprising an air compressor 102 and an oxygen compressor 103 is used to produce compressed oxygen, which is used in a gas-producing unit 104 to gasify heavy oil supplied through conduit 105. Steam is produced in a waste-heat boiler 106. The gas enters a desulfurizing unit 107, in which all sulfur compounds are removed except for a remainder which is less than 0.3 ppm. The purified gas flows in succession through a high-temperature conversion stage 108 and a low-temperature converstion stage 109 and is then treated in a scrubber 110 to removal all carbon dioxide. In a gas-separating unit 111, the gas is scrubbed with liquid nitrogen to remove CO and inert constituents and pure nitrogen formed as a by-product in the air-separating plant 101 and compressed to the required pressure in a compressor 114 is added to the unit 111 through conduit 113. The compressor 114 serves also as a circulating compressor to produce the refrigeration which is required for the low temperatures. The synthesis gas consisting of three-fourths hydrogen and one-fourth nitrogen is finally compressed in a synthesis gas compressor 115 to the pressure which is required for the synthesis.

The steam is exhausted from the waste-heat boiler 106 through conduit 116. A small part of that exhaust steam is supplied through conduit 117 as gasifying steam to the gasifying unit. The remainder of the steam flows through conduit 118 into a superheater section 119 of a steam boiler 120, where it is heated together with the additional steam produced in the boiler. The superheated steam flows through conduit 121 into a turbine 122, which drives the synthesis gas compressor 115. This turbine has a small condensing section and discharges most of the steam through conduit 123 against a back-pressure. Part of the steam in conduit 123 flows through conduit 124 into a condensing turbine 125, which drives the nitrogen compressor 114. Another part of this steam is supplied through conduit 126 to the high-temperature conversion stage 108 and another part through conduit 127 to the gas-producing plant 104, where it serves as heating steam. The remainder flows through conduit 128 successively into a back-pressure pass off turbine 129 diriving the oxygen compressor 103 and into a condensing turbine 130 driving the air compressor 102.

Oil at the rate which is required for the combustion in the steam boiler 120 comprising the superheater section 119 is supplied through conduit 131.

The steam may be utilized in a way which differs from that shown in FIGS. 1 and 2. In any case, the converting steam and the heating steam are not utilized for the respective purposes until they have been expanded in a turbine to perform work. At least one turbine for driving centrifugal compressors should consist of a condensing turbine or of a back-pressure pass off turbine having a condesing section.

EXAMPLE

Production of 100,000 standard cubic meters of hydrogen per hour from heavy oil by a treatment with steam under a pressure of 120 kilograms per square centimeter absolute pressure (FIG. 1)

98 percent oxygen at a rate 28,500 standard cubic meters per hour is produced in the air-separating plant 1 and compressed to 59 kilograms per square centimeter absolute pressure in the centrifugal compressor 3. In the oil-gasifying unit 4, this oxygen and steam supplied from conduit 14 at a rate of 15.0 metric tons per hour are used to gasify residual oil supplied at a rate of 37.6 metric tons per hour through conduit 5. The oil has a net calorific value of 9970 kilocalories per kilogram and contains 2 percent sulfur. The oil is gasified under a pressure of 55 kilograms per square centimeter absolute pressure. Saturated steam under a pressure of 120 kilograms per square centimeter absolute pressure is produced in the waste-heat boiler 6 at a rate of 96.1 metric tons per hour. Raw gas at a rate of 111,000 standard cubic meters per hour flows into the desulfurizing unit 7, which constitutes a physical scrubber operated with methanol at temperatures of about −20°C. to reduce the total sulfur content of the gas to 0.2 ppm. When the laden absorbent is regenerated, the exhaust gas from the regenerating unit contains in a concentration corresponding to about 20% $H_2S$ the sulfur compounds which have been removed from the gas by scrubbing. These sulfur compounds may be used to produce sulfuric acid or to produce elementary sulfur in a Claus furnace.

The desulfurized gas flows under a pressure of 46.5 kilograms per square centimeter into the high-temperature converstion stage 8, which is supplied with steam at a rate of 47.2 metric tons per hour, and then into the low-temperature conversion stage 9, which operates under a pressure of 45 kilograms per square centimeter absolute pressure and in which the carbon monoxide content is reduced to 0.5 percent. In the scrubber 10, the conversion gas at a rate of 160,000 standard cubic meters per hour is scrubbed to remove carbon dioxide except for a residue of 0.1. percent. This scrubber is also a physical scrubber, in which methanol is used as a scrubbing agent at temperatures below 0°C. The two scrubbers 7 and 10 are connected by the scrubbing agent circulation system so that the fine regeneration and the refrigeration are carried out jointly for both scrubbers. The gas from which carbon dioxide has been removed is finally supplied to the methanizing unit 11, in which the residual carbon monoixide and carbon dioxide are hydrogenated on a nickel catalyst at about 350°C. to form methane. Finished hydrogen at a rate of 102,000 standard cubic meters per hour (100,000 standard cubic meters $H_2$ per hour) is discharged from the methanizing unit 11 under a pressure of 42 kilograms per square centimeter absolute pressure and is compressed in the centrifugal compressor 12 to a pressure of 120 kilorgrams per square centimeter absolute pressure.

The gases produced in this plant have the following analyses:

|  | Crude gas | Converted gas | $H_2$ gas |
|---|---|---|---|
| $CO_2$ | 4.2 | 34.85 | — |
| CO | 47.6 | 0.50 | — |
| $H_2$ | 46.6 | 63.91 | 98.0 |
| $CH_4$ | 0.5 | 0.33 | 1.4 |
| $N_2$ | 0.2 | 0.14 | 0.2 |
| Ar |  | 0.27 | 0.4 |
| $H_2S$ | 0.48 |  | — |
|  |  | 0.2 ppm |  |
| COS | 0.02 |  | — |

The oxygen-producing plant has the following power requirement:

| Air compressor | 11,620 kW |
|---|---|
| Oxygen compressor | 5,870 kW |
| total: | 17,490 kW |
| The power requirement of the hydrogen compressor amounts to | 5,170 kW |
| total: | 22,660 kW |

Of the saturated steam flowing through conduit 13 at a rate of 96.1 metric tons per hour, 15.0 metric tons per hour are branched off and supplied through conduit 14 to the gasifying unit so that steam at a rate of 81.1 metric tons per hour is supplied through conduit 15 to the superheater section of the steam boiler 17. Additional steam at a rate of 41.7 metric tons per hour is produced in the steam boiler. After a common superheating, high pressure steam under a pressure of 110 kilograms per square centimeter absolute pressure and at 500°C. is conducted through conduit 18 at a rate of 122.8 metric tons per hour. Residual oil at a rate of 5.0 metric tons per hour must be supplied through conduit 27 to the boiler and superheater to be fired therein.

Part of this high-pressure steam at a rate of 58.6 metric tons per hour is first utilized in the back-pressure turbine 20 to drive the oxygen compressor 3 and flows under a lower pressure into the condensing turbine 21, which drives the air compressor 2. The remainder of the high-pressure steam, amounting to 64.2 metric tons per hour, enters the turbine 23, which drives the hydrogen compressor 12. Steam at a rate of 7.5 metric tons per hour is consumed in the condensing section of that turbine whereas steam at a rate of 56.7 metric tons per hour and under a pressure of 47.5 kilograms per square centimeter absolute pressure and at 390°C. is supplied to the process. Of this steam, 47.2 metric tons per hour serve as converting steam and are supplied to the high-temperature conversion stage 8. The remainder amounting to 9.5 metric tons per hour is utilized in the gasifying unit as heating steam to heat the heavy oil and the oxygen.

The power which is generated by the expansion of the converting steam and heating steam to the back-pressure of 47.5 kilograms per square centimeter absolute pressure amounts to 2950 kW so that only 19,710 kW of the 22,660 kW must be produced by an expansion and condensation of steam. Steam at a rate of 66.1 metric tons per hour is required for this purpose. Of that steam, 24.4 metric tons per hour are supplied by the waste-heat boiler associated with the gasifying unit so that the rate at which additional stema must be produced is only 41.7 metric tons per hour.

It is were desired to carry out the gasification under a pressure of 115 kilograms per square centimeter absolute pressure and produce steam in the waste-heat boiler also under a pressure of 120 kilograms per square centimeter absolute pressure, the converting steam and heating steam could not be used to generate power. The power requirement of the air-separating unit, which in this case produces liquid oxygen evaporated under a pressure of 120 kilograms per square centimeter absolute pressure, amount to 18,700 kW. Only 1040 kW are required to compress the synthesis gas from 98 to 120 kilograms per square centimeter absolute pressure.

Because a low-temperature converstion is not possible in this pressure range, the residual carbon monoxide and carbon dioxide must be removed from the gas by scrubbing it with an ammoniacal solution of a copper salt in a process in which the gasification is carried out under a high pressure. The carbon monoxide which has been removed by scrubbing is recovered and recycled to the gas stream before the conversion system. The gas compressor used to recycle the carbon monoxide requires 1920 kW. Hence the total power requirement of the process comprising high-pressure gasification amounts to 21,660 kW, which is less than the total power requirement (22,660 kW) of the medium-pressure process according to the invention but more than the actual power consumed in the medium-pressure process. This power consumption amounts to 19,710 kW, which figure is obtained in that the energy produced by the expansion of the converting stema and heating steam is deducted from the toal power requirement.

The finished hydrogen gas has the following analysis:

| | |
|---|---|
| $H_2$ | 97.5% |
| $CH_4$ | 1.2% |
| $N_2$ | 0.8% |
| are | 0.5% |
| Total: | 100.0% |

The higher nitrogen content is due to the fact that the gas is scrubbed with an ammoniacal solution of a copper salt and the solution is regenerated with a small amount of air.

What is claimed is:

1. In a process for producing hydrogen comprising the steps of:
    a. gasifying of a solid or liquid sulfur containing fuel with oxygen and steam to produce a raw sulfur containing gas;
    b. desulfurizing the sulfur containing raw gas from (a) by scrubbing;
    c. reacting the desulfurized raw gas from (b) with steam in a two stage conversion system to convert carbon monoxide therein to hydrogen and carbon dioxide using in the first stage of the conversion system an iron oxide-chromium oxide catalyst and temperatures of 350° to 500°C and in the second stage of the conversion system a copper containing catalyst and temperatures of 190° to 280°C;
    d. scrubbing the effluent gas from the conversion system in (c) to remove carbon dioxide and to recover raw hydrogen,
    e. purifying the raw hydrogen from (d) by removing residual traces of carbon dioxide and carbon monoxide, the improvement which comprises:
        i. carrying out the second stage of the conversion system under a pressure of 30 to 60 kg/cm² absolute,
        ii. cooling the sulfur containing raw gas from (a) in a waste heat boiler to produce steam at a pressure higher by at least 20 kg/cm² than the pressure in the second stage of the conversion system, which is expanded to perform work,
        iii. partly expanding a portion of the steam from (ii) in a steam turbine having a back pressure which is slightly higher than the pressure in the conversion system (c) and
        iv. introducing the partly expanded steam from (iii) and the desulfurized raw gas from (b) into the conversion system (c).

2. Process of claim 1 wherein the steam produced in (ii) is superheated before being expanded to perform work.

3. Process of claim 1 wherein purification step (e) is carried out by converting the residual oxides of carbon to methane.

4. Process of claim 1 wherein purification step (e) is carried out by scrubbing with liquid nitrogen whereby a hydrogen-nitrogen gas mixture suitable for the synthesis of ammonia is recovered.

5. Process of claim 1 wherein step (a) is carried out under normal or slightly elevated pressure and the resulting raw gas is compressed to the pressure of the carbon monoxide conversion system (c).

6. Process of claim 1 wherein step (a) is carried out under a pressure higher than the carbon monoxide conversion system (c).

* * * * *